Patented Sept. 2, 1952

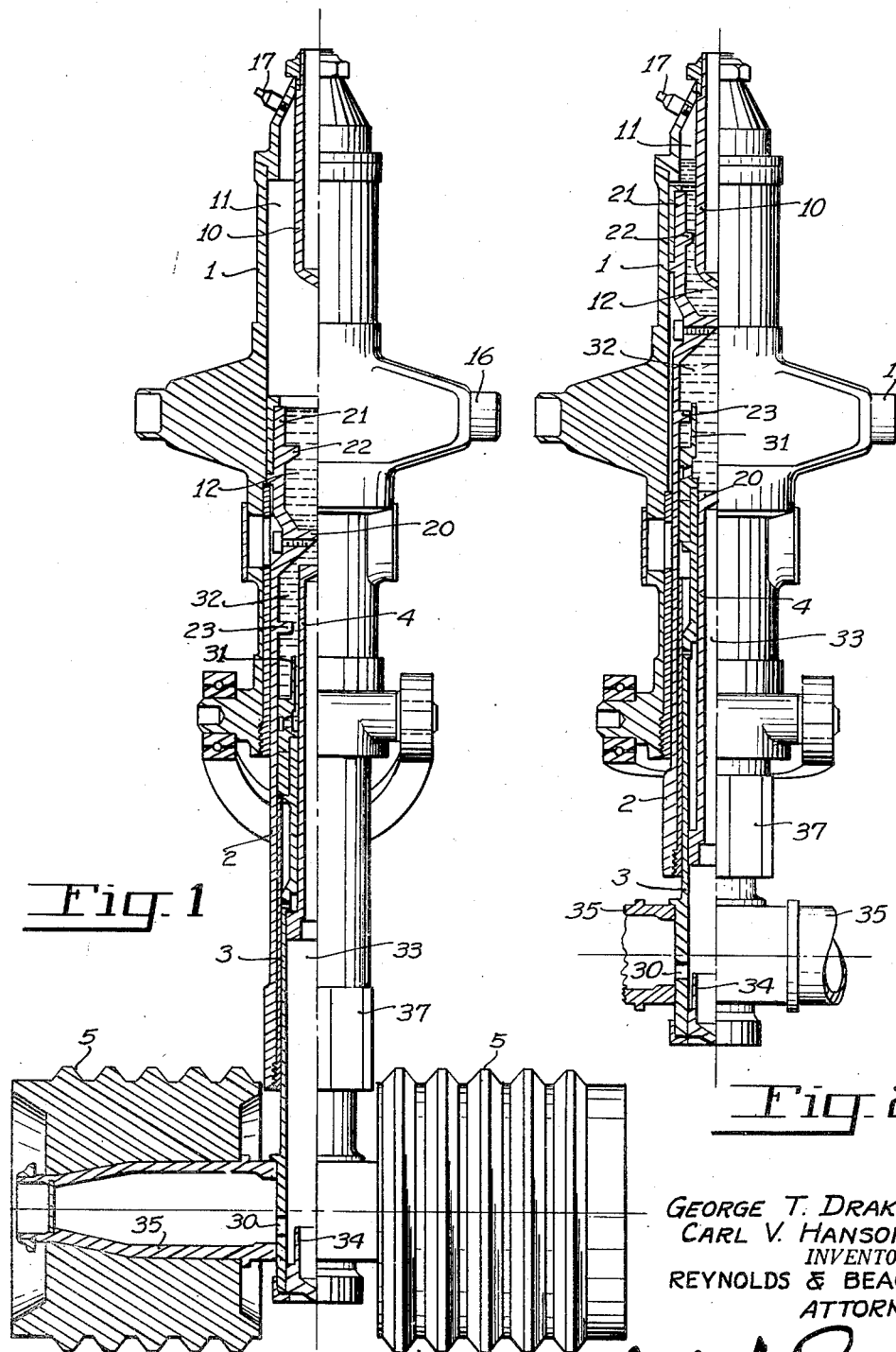

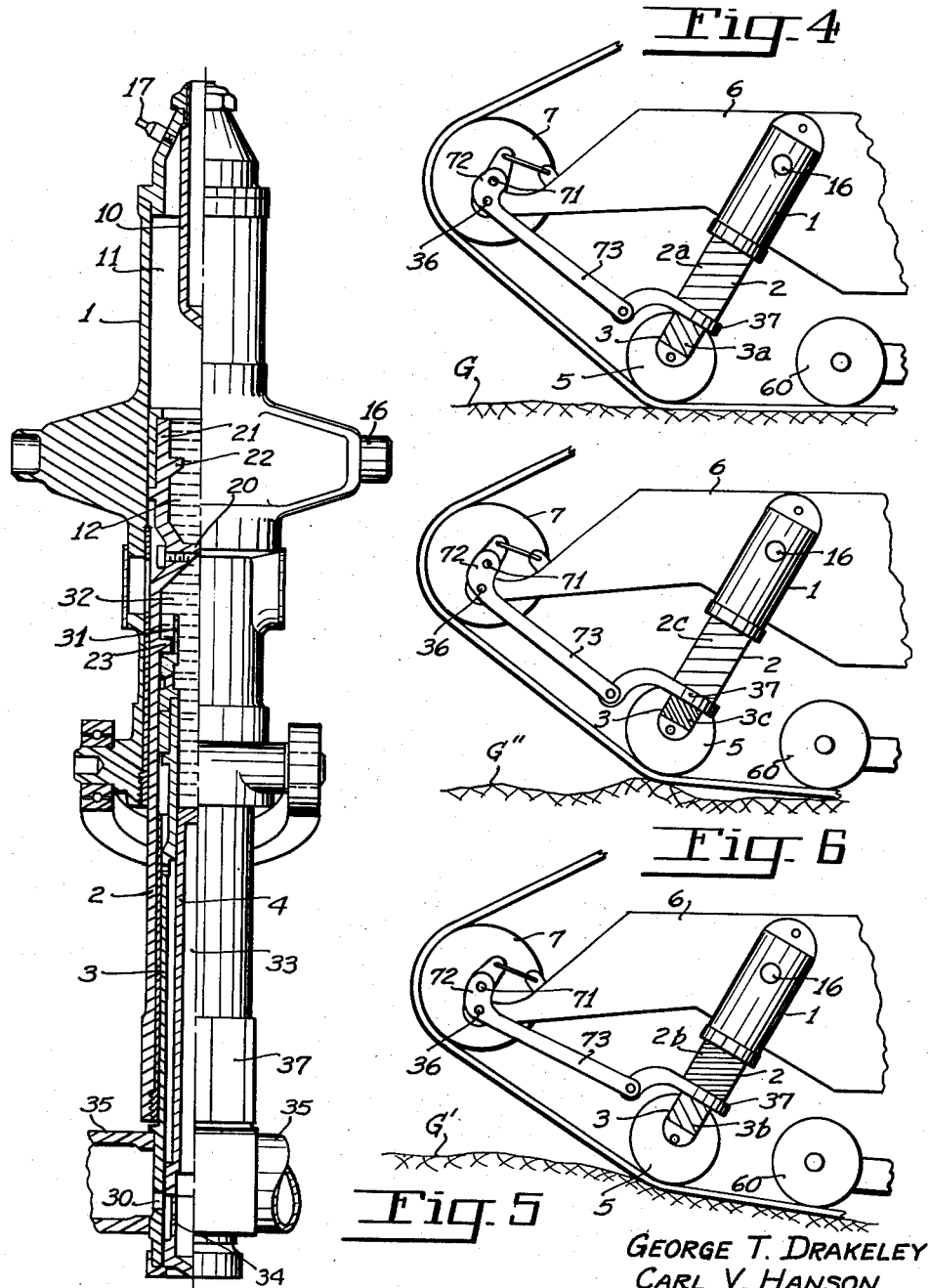

2,609,195

UNITED STATES PATENT OFFICE 2,609,195

OLEO-PNEUMATIC SHOCK STRUT

George T. Drakeley, Seattle, and Carl V. Hanson, near Renton, Wash., assignors to Boeing Airplane Company, Seattle, Wash., a corporation of Delaware Application July 11, 1949, Serial No. 104,052

8 Claims. (Cl. 267—64)

A pneumatic tire on an aircraft landing gear constitutes a resilient cushion, and absorbs the long, heavy loads such as arise in assuming the weight of the aircraft at landing, or in traveling over long swells in a runway surface, and it absorbs also the smaller, more abruptly applied forces arising as it rolls over ground irregularities, boulders, etc. For some service it is not practicable to use landing wheels; instead, tracktype landing gear is used. It is desirable that these, like tires, be inherently yieldable at all times to the two types of loads mentioned above, and it has been determined that it is preferable that each such type of yieldability be present and operative independently of the other such type.

In a companion application Serial No. 104,051, filed July 11, 1949, coincidentally herewith, now Patent No. 2,544,985, issued March 13, 1951, there is disclosed and claimed a track-type landing gear wherein a front bogie wheel is supported upon the lower end of a special tandem shockabsorbing device or air spring, which functions differently under different operating conditions. Under normal take-off or taxying conditions its upper relatively movable pair constitutes a relatively soft air spring, movable through a fairly large range, but in itself and through its connections to other parts it has large mass and high inertia, to the end that it will deflect materially only under the influence of forces applied gradually, such as might arise from assuming the weight of the aircraft, or from swells in the airfield surface. At the same time the lower, relatively movable pair constitutes a stiff air spring, but one of small mass and low inertia, to the end that this lower unit may deflect when the upper pair will not, upon the application of a force which is not necessarily large, but which is abruptly applied, such as might develop from encountering a boulder. Under conditions developing during brake application, however, the soft, upper pair would tend to deflect to such an extent, in response primarily to brake torque, as to leave but little if any ability to absorb those loads which it is designed to absorb, with resultant undesirable results, as has been pointed out in the companion application. Accordingly, means are provided whereby the application of braking forces reacts automatically to "lock out" or neutralize, and thus prevent relative movement of, the members of the soft pair purely as a result of braking. The combination as a whole, and the factors governing its selection and arrangement, are outlined in full in the companion application.

In that application, while the use of such a tandem shock absorber or air spring unit having the hard-soft characteristics mentioned is highly desirable, it is not wholly essential and, in any event, the particular form adopted is not in itself essential in the combination therein set forth, for other forms whereby the same results can be achieved can be employed. Accordingly, the structure of the shock absorber or air spring unit itself was not claimed in that case, and the same constitutes the subject-matter of this application.

It is a primary object of the present invention to provide a tandem air spring or shock absorbing device, preferably in a form which is extensible downwardly, and which will have the characteristics indicated above, permitting yielding in one unit under the influence of forces gradually applied, and at the same time of yielding in the other unit even to small forces, abruptly applied. Additionally, it is an object to provide a shock absorbing device of the character just specified wherein it is possible to "lock out" or neutralize the soft unit under special circumstances or against special forces, while still retaining its yieldability under all circumstances, and to ground forces which it is designed to absorb.

Another object is to provide a shock absorber formed as two units in tandem, so arranged that the soft unit will yield to one characteristic type of force without material deflection of the hard unit, and conversely, in such manner that the hard unit will yield to a characteristically different type of force without material deflection of the soft unit.

It is a still further object to provide a shock absorbing device of the character indicated, in which oil may be employed in each of the shock absorbing units as a final damping or bottoming agent, and to regulate rebound, and which in particular is so constructed and arranged as to avoid to a high degree the probability of leakage of air into the oil chamber, particularly in the lower unit where the total and unit pressures are high.

Still a further object, in such an oleo-pneumatic tandem unit, is the provision of a construction wherein, notwithstanding the high total load upon the hard unit, the fluid pressure does not change to a high degree between fully relaxed, though preloaded position, and bottomed position.

With these objects in mind, and others as will appear as this specification progresses, this invention comprises the novel shock absorbing device, and the novel combination and arrangement of the parts thereof, as shown in the accompanying drawings in the preferred form of execution, and as will be more fully explained and defined hereinafter.

Figure 1 is in part an elevation and in part an axial sectional view through such a shock strut, with parts in their relaxed position, without appreciable compressional stress on the strut.

Figure 2 is a view similar to Figure 1, showing one of the units—the soft one—substantially fully compressed, and the hard unit partially compressed, as they might be under conditions where the strut is supporting a large ground load, and at the moment of impact with some abruptly compressing object, such as a boulder.

Figure 3 is a view similar to Figures 1 and 2, but showing the parts in positions such as they might occupy with the strut supporting a load and upon suddenly encountering a very abruptly distorting force.

Figures 4, 5 and 6 are diagrammatic views of a part of a track landing gear in which the shock strut of this invention is incorporated, illustrating diagrammatically the application of stresses under different load conditions to the shock strut, and corresponding roughly to the positions of Figures 1, 2 and 3, respectively.

Before proceeding to a description of this invention, it is helpful to its understanding to point out that the two units of this shock strut, the upper soft unit and the lower hard unit, are both operative at all times when the airplane is groundborne, and are completely independent and lacking in communication between one another, although designed for cooperation in such manner that, as previously pointed out, one will absorb one type of load and the other will absorb a different type of load, or both may operate concurrently but differently if both types of load are applied simultaneously. In particular this invention is to be distinguished from those known shock struts wherein one of two units collapses slowly but completely upon touching down, and has no function so long as the airplane is wholly groundborne, unless perhaps as an hydraulic reservoir or damper for the second unit which alone remains operative while groundborne.

The shock strut is made up of three principal parts: an outer cylinder 1, an inner plunger 3, and an intermediate sleeve 2, which is formed with a head 20 serving as a plunger as it reciprocates within the outer cylinder 1, and itself, below the head 20, constituting a cylinder within which is reciprocable the inner plunger 3. The inner plunger 3 is preferably hollow, not only for lightness of weight, but also to constitute an air reservoir of large volume, and within it is reciprocable a floating separator 4, which serves to separate oil in the space 32 from air within the space 33. Particularly is this desirable since the oil is here at the top of the downwardly opening cylinder within the sleeve 2, and the air space is at the bottom thereof. In the upper unit oil is received within the space 12, constituted by the upwardly directed cup 21 at the upper end of the sleeve 2, above the head 20, and in the space 11 thereabove air is contained.

The air within the space 11 is precompressed, through any suitable valve such as is indicated at 17, to a low pressure, when parts are relaxed, such pressure in a typical installation aggregating a force of 2440 pounds. When the intermediate element 2 moves upwardly within the outer cylinder 1, the air within the space 11 is further compressed, and because the volume contracts materially within the distance permitted for such travel, the pressure within the space 11, in the typical installation referred to, builds up to 19,230 pounds force when the intermediate element 2 bottoms within the cylinder 1. These figures, of course, are purely for purposes of illustration. In the same installation, however, the initial pressure within the space 33, and other space normally in free communication therewith, develops 41,000 pounds force, much higher than the starting force in the upper unit, and higher even than the bottoming force in that upper unit, but because the space 33 and the remaining air space with which it is in communication is very large, bottoming of the plunger 3 within the intermediate unit 2 does not so greatly build up force in the lower unit and space 33, but builds it up to 60,000 pounds force in the particular unit employed for illustration.

As a convenient means of increasing the volumetric capacity of the air chamber 33 in the lower unit, wheel spindles 35, whereon are journaled supporting wheels 5, are formed hollow, though closed, and communicate with the interior of the air chamber 33 by way of ports 30.

The two units, the upper one and the lower one, become in effect a tandem air spring, but the high initial loading of the lower unit makes of this a stiff or hard unit, and the lesser loading of the upper unit makes it a soft unit. However, it does not necessarily follow that the upper soft unit will bottom under all conditions before movement of the lower unit commences, nor does it necessarily follow that the lower hard unit will not bottom prior to bottoming, or indeed prior to appreciable compression, of the upper soft unit. The conditions under which the various operations will occur will be explained more fully hereinafter. At this time it is desired only to point out that the mass, and consequently the inertia, connected to and necessarily movable with the intermediate element 2 is high as compared to the mass connected to and movable with the lower plunger 3. In consequence, while the lower unit is the hard unit, it will move under the influence of a force, sufficiently abruptly applied, which by reason of its abrupt application would cause little effect upon the soft upper unit, whereas the soft upper unit will move under the influence of forces less abruptly applied, but applied through a longer period of time, which forces might but little affect the hard lower unit.

One purpose in filling each of the upper and lower units in part with oil is to cushion them as they approach bottoming position of the parts. A metering plug 10, projecting downwardly within the upper space 11, will enter the liquid as the cup 21 of the sleeve 2 moves upwardly toward bottoming position, and by providing this cup 21 with a restriction 22, capable of fitting fairly closely about the metering plug 10, as seen in Figure 2, very appreciable cushioning action is possible. Likewise by providing the intermediate sleeve 2, within the oil space 32, with a constrictive annular, axially directed flange 23, cooperating, as the plunger 3 approaches bottoming position within the sleeve 2, with an annular metering projection 31, damping action is achieved near the bottoming of the relatively movable elements 3 and 2.

It will be realized that the air pressure within the floating separator 4 urges the latter upwardly and thereby impresses its pressure upon the oil within the space 32. Moreover, since the air pressure is effective on a greater area of the separator 4 than is subjected to the pressure within the oil, a smaller pressure within the air space 33 will build up a larger pressure within the oil space 32, and this circumstance will tend to obviate leakage from the air space into the oil space, and will lessen the necessary total pressure to be maintained within the air space. Moreover, because of the large volume within the air space 33, or in communication therewith, and because of the smaller area of the separator subjected to oil pressure, the latter will move farther downwardly upon compression than the annular plunger 3 will move upwardly within the cylinder 2; yet the percentage of decrease in volume of the air space is relatively small, and the build-up of pressure due to such compressional movement in the lower unit is correspondingly small. To assist in cushioning bottoming movement of the separator 4 its lower end, as it reaches the annular axially directed flange 34, closes off the annular space between the wall of the chamber 33 and this flange 34, and at the same time cuts off the port 30 from the space 33, the combined action creating a cushioning effect at the lowermost end of the down stroke of the separator 4. Such position of the parts is seen in Figure 3.

This tandem oleo-pneumatic shockstrut, which might more properly be called a tandem air spring, constitutes one of the resiliently yieldable units which supports the front bogie wheel 5 of a track-type landing gear, such as is disclosed in detail in the companion application, referred to above. The cylinder 1 of the unit is journaled by the trunnions 16 upon the frame 6 of the landing gear, and the head 37 at the lower end of the intermediate sleeve 2 is connected to a long, rearwardly directed arm 73 of a bell crank lever which is pivotally mounted between its ends at 36 upon the forward point of the frame 6, and which has a generally upwardly directed arm 72, whereon the braking wheel 7 of the track-type landing gear is journaled at 71. The track band 61 extends about various wheels, including the braking wheel 7, the front bogie wheel 5, and other wheels such as are represented by the bogie wheel 60. It will be observed that the braking wheel 7 and parts associated therewith, and the bell crank lever 72, 73 combine with the head 37 to give to the intermediate element 2 a fairly large mass and consequently high inertia, such as has been referred to hereinbefore, where the lower unit 3 and parts associated therewith have appreciably less mass, and consequently lower inertia.

Referring to Figure 4, wherein the landing gear and the aircraft supported thereby are static and groundborne, or merely taxying over a level, smooth ground surface, represented at G, such loading as there is primarily static loading on the air within the space 11, as is represented diagrammatically at 2a. It can be assumed that the static load is insufficient to compress appreciably the already highly compressed air within the air space 33, and this is intended to be represented at 3a. This condition of the parts is approximated in the positions shown in Figure 1, although in Figure 1 parts may be considered as somewhat more fully relaxed, such as they might be when airborne.

In Figure 5 the ground surface G' is irregular, to the extent that there is an appreciable swell which reacts through the front bogie wheel 5, tending to compress the tandem unit. The compressional force thus created is applied over an appreciable length of time, and is not abrupt; consequently it effects but little, if any, compression of air within the air space 33, but it does effect appreciable compression of the air within the air space 11 of the soft unit, causing the element 2 to move upwardly within the cylinder 1, somewhat after the manner suggested in Figure 2, and effecting compression as indicated at 2b in Figure 5, without effecting appreciable compression of the hard lower element as represented at 3b. In Figure 2, however, the forces applied are assumed to be sufficiently great that there has been, in addition to compression of the soft unit substantially to bottoming, a rather appreciable compression of the hard unit as well.

In Figure 6 the ground G' is assumed only to be rough in surface, with rather abrupt irregularities, as shown, which will react rather forcibly, but quickly, upon the tandem unit. Because of the large mass and inertia of the upper soft unit, there will be little compresison thereof, as indicated at 2c, during the short time the distorting or compressing force is operative, but this force, sufficiently abruptly applied, causes rather appreciable compression, as indicated at 3c, of the hard lower unit, which has so much less mass and inertia that it will yield to such abruptly applied forces. This condition of the parts is illustrated in Figure 3, where the lower unit is substantally bottomed, whereas the upper unit is but little compressed.

With such a unit a ground-engaging element of a landing gear may yield to long yet relatively soft forces, and has the capability, moreover, of yielding to abrupt forces of shorter duration, if of sufficient magnitude, in each instance without necessarily or to any appreciable extent affecting the other unit.

In addition, such tandem unit affords the possibility, by mechanism described in the companion application, of resisting brake-induced compression of the soft unit, and consequent substantially complete loss of its ability to absorb shocks within the landing bogie. Even though the soft unit is wholly "locked out" on brake application, through the automatic operation of neutralizing forces resisting brake-induced compression, it still remains operative to cushion applied ground loads superimposed upon the braking forces. Moreover, the hard unit is substantially unaffected by braking forces, hence is always available. Since this tandem unit has utility without regard to the specific use just mentioned, it has not been considered necessary to go into detail in the present application regarding that particular use.

We claim as our invention:

1. A shock absorber for use in an aircraft landing gear, comprising an upper terminal member for connection to the aircraft, a lower terminal member for connection to a ground-contacting element, and an intermediate member, all three members interfitting for relative telescoping movement, and formed and cooperatively arranged to define an upper cylinder and plunger pair and a separate lower cylinder and plunger pair, the members of each such pair being so relatively movable at all times simultaneously with but independently of relative movement of the members of the other pair, both such pairs being pneumatically preloaded, the lower pair materially more greatly than the upper pair, the intermediate member being of large effective mass and consequent high inertia, whereby its telescoping movement relative to the upper one of the terminal members occurs primarily under the influence of a long-continued force, despite the lower preloading, and the lower terminal member being of small effective mass as compared to the effective mass of the intermediate member, whereby its telescoping movement relatively to the intermediate member occurs primarily under the influence of abruptly applied force, despite the higher preloading.

2. A shock absorber as in claim 1, characterized in the inclusion of a damping liquid partly filling each of the two separate cylinder and plunger pairs, and means carried by and cooperating between each of the members of the respective pairs, within their extreme range of movement, to damp excessive contractive telescoping movement hydraulically.

3. A shock absorber as in claim 2, including also final cushioning means cooperating between each cylinder, its plunger, and the cylinder's liquid contents.

4. A shock absorber comprising an outer cylinder opening only downwardly, a sleeve slidably received therein, and formed with a diaphragm near its upper end, to constitute a plunger reciprocable within the outer cylinder, said cylinder, above said plunger, containing a liquid and thereabove a gas under predetermined pressure, an annular plunger having a hollow stem and reciprocable within the lower end of said sleeve, a floating separator reciprocable within said annular plunger and its stem, a liquid filling the space within the lower part of the sleeve, above the annular plunger and the separator, and a gas at a pressure materially exceeding that of the gas above the diaphragm, filling the hollow stem of the annular plunger, and urging the separator into the annular plunger to preload the liquid therein to a high pressure.

5. A shock absorber as in claim 4, wherein gas pressures in the respective chambers are of such value, relative to the chambers' volumes and the plungers' strokes, that the loading at bottoming of the upper relatively reciprocable pair is less than the initial preloading of the lower relatively reciprocable pair.

6. A shock absorber as in claim 4, wherein the separator area exposed to the oil is materially less than its area which is exposed to the gas under pressure.

7. A shock absorber as in claim 4, wherein the volume of air-filled space beneath the separator is large in comparison to the oil-filled space between the separator and the annular plunger, thereby to minimize increase of total pressure with maximum relative compressional movement of the lower pair.

8. A shock absorber comprising an intermediate member and two end members, the latter arranged for connection respectively to two parts which are to be resiliently held apart, one such end member cooperating with the intermediate member for relative movement, as a first oleo-pneumatic pair at a given positive pressure loading, and the other end member cooperating with the intermediate member for relative movement independently of the first pair, to constitute a second oleo-pneumatic pair independent of the first such pair, and at a higher pressure loading, to differently modify the resistance to relative movement of the members of the respective pairs, whereby one pair is operative at all times as a soft unit, yieldable to forces long-continued but not to abrupt forces, and the other pair is operative, also at all times, as a hard unit, yieldable to forces abruptly applied but of smaller absolute value than those which affect the soft unit.

GEORGE T. DRAKELEY.
CARL V. HANSON.

REFERENCES CITED

The following references are of record in the file of this patent:

UNITED STATES PATENTS

| Number | Name | Date |
|---|---|---|
| 1,780,659 | Wallace | Nov. 4, 1930 |
| 1,918,697 | Gruss | July 18, 1933 |
| 2,008,094 | Chester | July 16, 1935 |
| 2,163,459 | Cleveland | June 20, 1939 |
| 2,333,096 | Dowty | Nov. 2, 1943 |
| 2,363,485 | Dawn | Nov. 28, 1944 |